UNITED STATES PATENT OFFICE.

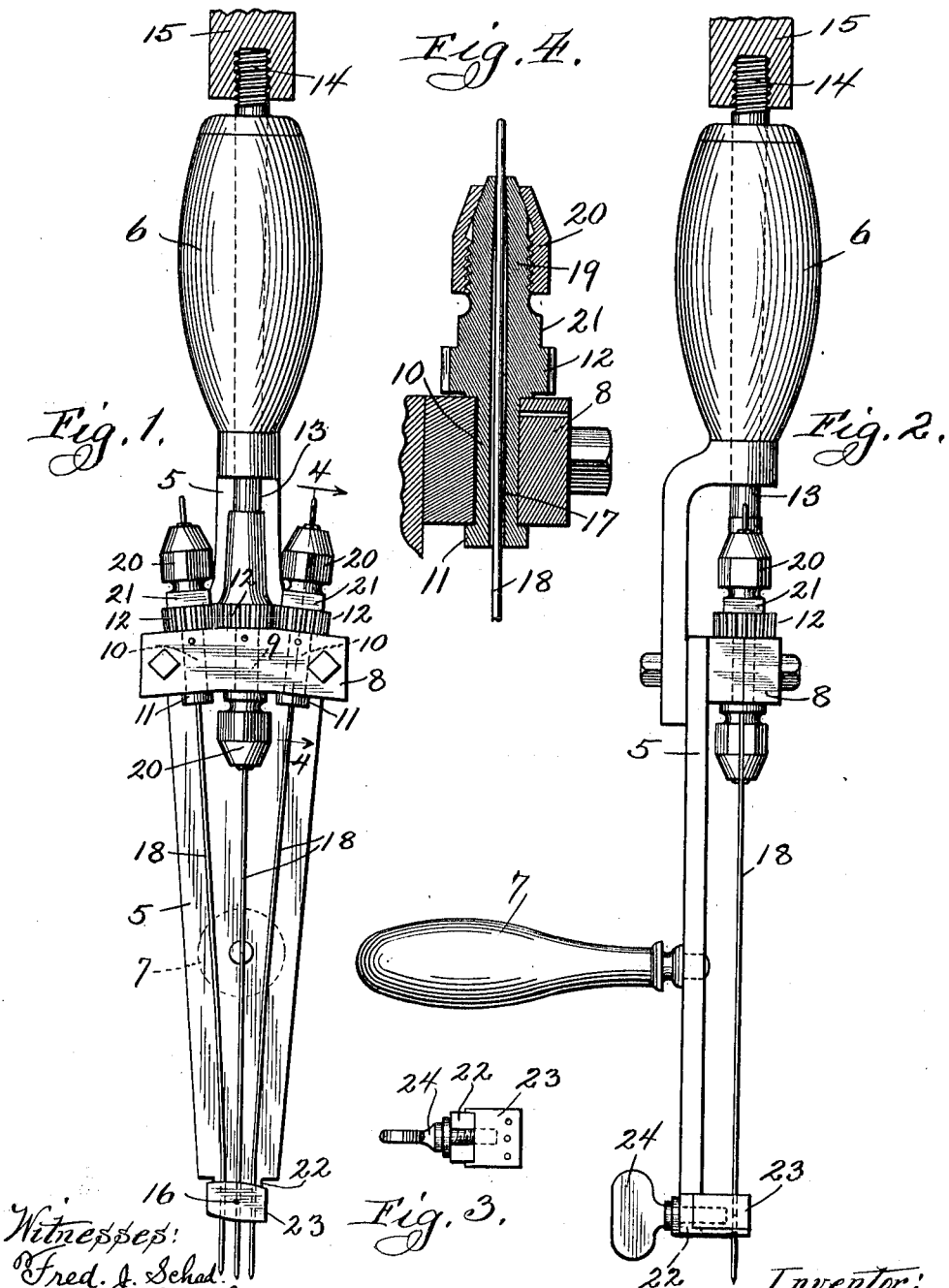

WALTER LANE, OF CHICAGO, ILLINOIS.

MULTIPLE DRILL.

1,020,359.

Specification of Letters Patent.

Patented Mar. 12, 1912.

Application filed October 20, 1904. Serial No. 229,314.

*To all whom it may concern:*

Be it known that I, WALTER LANE, a citizen of the United States, residing at Chicago, in the county of Cook and State of Illinois, have invented a new and useful Multiple Drill, of which the following is a specification.

My invention relates to drills for boring holes parallel, close together and two or more at a time; and the objects of my improvement are first, to provide a drill which will bore a plurality of parallel holes close together in one operation; second, to facilitate the rapid and easy adjustment of each one of the drills; third, to enable the drills to be spaced independently nearer together or farther apart; fourth, to make a cheap and durable construction and other objects which will become apparent from the description to follow.

Heretofore it has been impossible to drill two or more holes close together at the same time, and therefore when it was desired to drill several holes close together, as is required for bridge string pins in pianos, one hole at a time was bored by a single drill. By the use of my invention the required number of holes for this purpose, being usually three, can all be bored at the same time by one operation. When one hole is bored at a time it is difficult to have all the holes of a series drilled at the same angle, *i. e.* parallel, but with the use of my improved drill all the holes of a series are drilled absolutely parallel.

My invention consists of gearing as many chucks together as there are drills required and so arranged that their axial lines meet at a point somewhat remote from the gears. The drills are of such length that their business ends would meet when one is fastened in each chuck, if their natural course were not detracted by a guide block. The guide block is provided with as many holes as there are drills, all the holes being parallel, and the drills pass through these holes and are guided thereby; the guide block is kept as near the business ends of the drills as is permissible.

Referring to the drawing forming a part of this specification, Figure 1, is a front elevation of a drill embodying my invention; Fig. 2, is a side elevation of the same; Fig. 3 is a bottom plan of the lower end of the same and Fig. 4, is a section on line 4—4 of Fig. 1.

Similar reference characters refer to similar parts throughout the several views.

The frame 5, is provided with two handles 6 and 7 preferably at right angles to each other to manipulate the device, and midway between these two handles with the bearing block or bracket 8. In the block 8 are journaled three spindles a center one 9 and two side spindles 10. Each of the spindles is provided with a collar 11 below the block 8, and with a small pinion 12 above the block 8; the pinions 12 on the side spindles 10 meshing with the pinion 12 on the center spindle 9; so that when one is rotated all three must rotate. A shaft 13 is made integral with the spindle 9 and extends up from the gear 12 preferably through and some distance beyond the handle 6 where it is provided with a screw thread 14, to which may be secured any means for rotating shaft 13, as for instance the end of a flexible shaft 15.

The three spindles 9, 10 and 10 are arranged at angles to each other so that their axial lines cross each other at the point 16. Each spindle is provided with a central hole 17 large enough to receive the shank of a drill 18; and to clamp the drill securely to rotate with its coöperating spindle, each spindle is provided with a screw threaded concentric extension 19, the end of which is split and conical shaped. A nut 20 having a conical interior end is screwed on over the extension 19 to clamp the drill in place. A flattened portion 21 may be provided on the extension 19 to apply a wrench to when it is desired to adjust the nut 20.

A portion of the frame 5 is extended down adjacent to the point 16 where it is provided with the slotted end 22. A guide block 23 is removably secured to the end 22 in any convenient manner, as by a thumb screw 24 passing through the slot and into the block 23. The block 23 is provided with three parallel holes through which the drills 18 pass and are guided thereby. I prefer to have the block 23 also serve to determine the depth of the holes to be bored; *i. e.*, the length of the drill below the lower surface of the block 23 will be the depth of the hole. The drills can be adjusted to suit the requirement by the clamping nuts 20.

It will be noted that the center hole in the block 23 is concentric with the center spindle 9, while the two outer holes in the block 23 are not concentric with the spindles 10; this of course requires that the two outer drills 18 be somewhat bent between the upper side of the block 23 and the lower end of the spindles 10, and as the drills are rotated they must continually be bending. When it is desired to change the spacing of the business end of the drills, the block 23 is simply removed and another block having the holes spaced the required distance is substituted therefor.

While I have shown a comparatively narrow block 23 for guiding the drills, I desire to be understood by the interpretation of the appended claims that a much wider block or even two separate blocks may be used to guide the drills. When two separate blocks are used the upper one would only be required to bear against the outer sides of the two outer drills; and this upper block may even take the form of a revolving ring to reduce the friction and made with means for adjusting it nearer to or farther from the lower block.

Having thus fully descibed my invention what I claim as new and desire to secure by Letters Patent of the United States is:—

1. In a device of the class described, a suitable frame provided at one end with a longitudinal slot, a lateral extension on said frame provided with a central perforation, a removable block attached by a thumb screw to the slotted end of said frame provided with a central perforation concentric with the perforation in said lateral extension, a handle at the other end of said frame provided with a longitudinal perforation concentric with said two former named perforations, a spindle rotatably mounted in said lateral extension perforation, a drill connected to said spindle rotatably mounted in said block perforation, and a shaft connected to said spindle rotatably mounted in said handle perforation.

2. In a device of the class described, a suitable frame provided at one end with a longitudinal slot, a lateral extension on said frame provided with a central perforation a removable block attached by a thumb screw to the slotted end of said frame provided with a central perforation concentric with the perforation in said lateral extension, a handle at the other end of said frame provided with a longitudinal perforation concentric with said two former named perforations, a spindle rotatably mounted in said lateral extension perforation, a drill connected to said spindle rotatably mounted in said block perforation, and a shaft connected to said spindle rotatably mounted in said handle perforation, a second perforation in said lateral extension, a second perforation in said block parallel to the first named block perforation, a spindle rotatably mounted in said second named lateral extension perforation, a second drill connected to said second named spindle rotatably mounted in said second block perforation and gear connection between said two spindles to cause them to rotate simultaneously.

In testimony whereof, I have signed my name to this specification in the presence of two subscribing witnesses this 11th day of October, 1904, at Chicago, Illinois.

WALTER LANE.

Witnesses:
JAMES CODLING,
R. J. JACKER.

---

Copies of this patent may be obtained for five cents each, by addressing the "Commissioner of Patents, Washington, D. C."